United States Patent
Bai et al.

(10) Patent No.: US 11,805,499 B2
(45) Date of Patent: Oct. 31, 2023

(54) INCREASE DIVERSITY OF SLOT AGGREGATION USING SLOT-SPECIFIC CYCLIC DELAY DIVERSITY

(71) Applicant: QUALCOMM Incorporated, San Diego, CA (US)

(72) Inventors: Tianyang Bai, Somerville, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/065,402

(22) Filed: Oct. 7, 2020

(65) Prior Publication Data

US 2021/0185669 A1 Jun. 17, 2021

Related U.S. Application Data

(60) Provisional application No. 62/947,884, filed on Dec. 13, 2019.

(51) Int. Cl.
*H04W 72/0446* (2023.01)
*H04L 27/26* (2006.01)
*H04W 72/21* (2023.01)

(52) U.S. Cl.
CPC ..... *H04W 72/0446* (2013.01); *H04L 27/2607* (2013.01); *H04W 72/21* (2023.01)

(58) Field of Classification Search
CPC .......... H04W 72/0446; H04W 72/0413; H04L 27/2607; H04L 27/2602; H04B 7/063; H04B 7/0667; H04B 7/0885; H04B 7/0413

See application file for complete search history.

(56) References Cited

U.S. PATENT DOCUMENTS

| | | | | |
|---|---|---|---|---|
| 2018/0048365 A1* | 2/2018 | Yoo | ...................... | H04B 7/0486 |
| 2018/0167252 A1* | 6/2018 | Wang | ................... | H04B 7/0404 |
| 2020/0145999 A1* | 5/2020 | Salah | ................ | H04W 72/0446 |
| 2021/0160027 A1* | 5/2021 | Werner | ................. | H04L 1/1861 |
| 2021/0184819 A1* | 6/2021 | Takeda | ................. | H04L 5/0057 |
| 2022/0030517 A1* | 1/2022 | Takahashi | ............ | H04B 7/0413 |

(Continued)

FOREIGN PATENT DOCUMENTS

| | | | | |
|---|---|---|---|---|
| CN | 111182631 A | * | 5/2020 | |
| WO | WO-2019158002 A1 | * | 8/2019 | ........... H04B 7/0626 |
| WO | WO-2020194742 A1 | * | 10/2020 | |

OTHER PUBLICATIONS

International Search Report and Written Opinion—PCT/US2020/060885—ISA/EPO—dated Mar. 31, 2021.

(Continued)

*Primary Examiner* — Sharmin Chowdhury
(74) *Attorney, Agent, or Firm* — QUALCOMM Incorporated

(57) ABSTRACT

Certain aspects of the present disclosure provide techniques for increasing diversity of transmissions with slot aggregation using slot-specific cyclic delay diversity (CDD). A method that may be performed by a transmitting device includes determining to transmit a signal using cyclic delay diversity (CDD) in a plurality of slots; and transmitting the signal using a different cyclic delay in each slot of the plurality of slots.

28 Claims, 9 Drawing Sheets

(56) References Cited

U.S. PATENT DOCUMENTS

2022/0190892 A1* 6/2022 Park ..................... H04W 72/12

OTHER PUBLICATIONS

NTT Docomo: "Multi-Degree Cyclic Delay Diversity with Frequency-Domain Channel Dependent Scheduling", 3GPP Draft, 3GPP TSG-RAN WG1 Meeting #44bis, R1-060991, Multi-Degree CDD, 3rd Generation Partnership Project (3GPP), Mobile Competence Centre, 650, Route Des Lucioles, F-06921 Sophia-Antipolis Cedex, France, vol. RAN WG1, No. Athens, Greece, Mar. 21, 2006, Mar. 21, 2006 (Mar. 21, 2006), XP050101890, 5 Pages, p. 2-p. 3.
Partial International Search Report—PCT/US2020/060885—ISA/EPO—dated Feb. 10, 2021.

Samsung: "Layer 1 Enhancement for URLLC", 3GPP Draft, 3GPP TSG RAN WG1 #94, R1-1808787, EURLLC L1 Enhancements, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516160, 14 Pages, Retrieved from the Internet: URL: http://www.3gpp.org/ftp/tsg%5Fran/WG1%5FRL1/TSGR1%5F94/Docs/R1%2D1808787%2Ezip. [retrieved on Aug. 11, 2018] p. 6.
Vivo: "Remaining Issues on Multi-TRP/Panel Transmission", 3GPP Draft, 3GPP TSG RAN WG1 #98, R1-1908166, Remaining Issues on Multi-TRP/Panel Transmission Final, 3rd Generation Partnership Project (3GPP), Mobile Competence Centre, 650, Route Des Lucioles, F-06921 Sophia-Antipolis C, vol. RAN WG1, No. Prague, CZ, Aug. 26, 2019-Aug. 30, 2019, Aug. 17, 2019 (Aug. 17, 2019), XP051764785, 18 Pages, Retrieved from the Internet: URL: http://www.3gpp.org/ftp/tsg_ran/WG1_RL1/TSGR1_98/Docs/R1-1908166.zip. p. 1-p. 6.

* cited by examiner

INCREASE DIVERSITY OF SLOT AGGREGATION USING SLOT-SPECIFIC CYCLIC DELAY DIVERSITY

CROSS-REFERENCE TO RELATED APPLICATIONS

This application claims benefit of and priority to U.S. Provisional Patent Application No. 62/947,884, filed Dec. 13, 2019, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for increasing diversity of transmissions with slot aggregation using slot-specific cyclic delay diversity (CDD).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved coverage of physical downlink shared channel (PDSCH) and physical uplink shared channel (PUSCH) transmissions.

Certain aspects provide a method for wireless communication by a transmitting device. The method generally includes determining to transmit a signal using cyclic delay diversity (CDD) in a plurality of slots; and transmitting the signal using a different cyclic delay in each slot of the plurality of slots.

Certain aspects provide a method for wireless communication by a receiving device. The method generally includes determining that a signal from a transmitting device is transmitted using cyclic delay diversity (CDD) in a plurality of slots; and receiving the signal based on a different cyclic delay in each slot of the plurality of slots.

Certain aspects provide an apparatus for wireless communication. The apparatus generally includes a processor configured to: determine to transmit a signal using cyclic delay diversity (CDD) in a plurality of slots; and to transmit the signal using a different cyclic delay in each slot of the plurality of slots; and a memory coupled with the processor.

Certain aspects provide an apparatus for wireless communication. The apparatus generally includes a processor configured to: determine that a signal from a transmitting device is transmitted using cyclic delay diversity (CDD) in a plurality of slots; and to receive the signal based on a different cyclic delay in each slot of the plurality of slots; and a memory coupled with the processor.

Certain aspects provide an apparatus for wireless communication. The apparatus includes means for determining to transmit a signal using cyclic delay diversity (CDD) in a plurality of slots and means for transmitting the signal using a different cyclic delay in each slot of the plurality of slots.

Certain aspects provide an apparatus for wireless communication. The apparatus includes means for determining that a signal from a transmitting device is transmitted using cyclic delay diversity (CDD) in a plurality of slots; and means for receiving the signal based on a different cyclic delay in each slot of the plurality of slots.

Certain aspects provide a computer readable medium containing program instructions for causing a computer to perform operations including: determining to transmit a signal using cyclic delay diversity (CDD) in a plurality of slots; and transmitting the signal using a different cyclic delay in each slot of the plurality of slots.

Certain aspects provide a computer readable medium containing program instructions for causing a computer to perform operations including: determining that a signal from a transmitting device is transmitted using cyclic delay diversity (CDD) in a plurality of slots; and receiving the signal based on a different cyclic delay in each slot of the plurality of slots.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
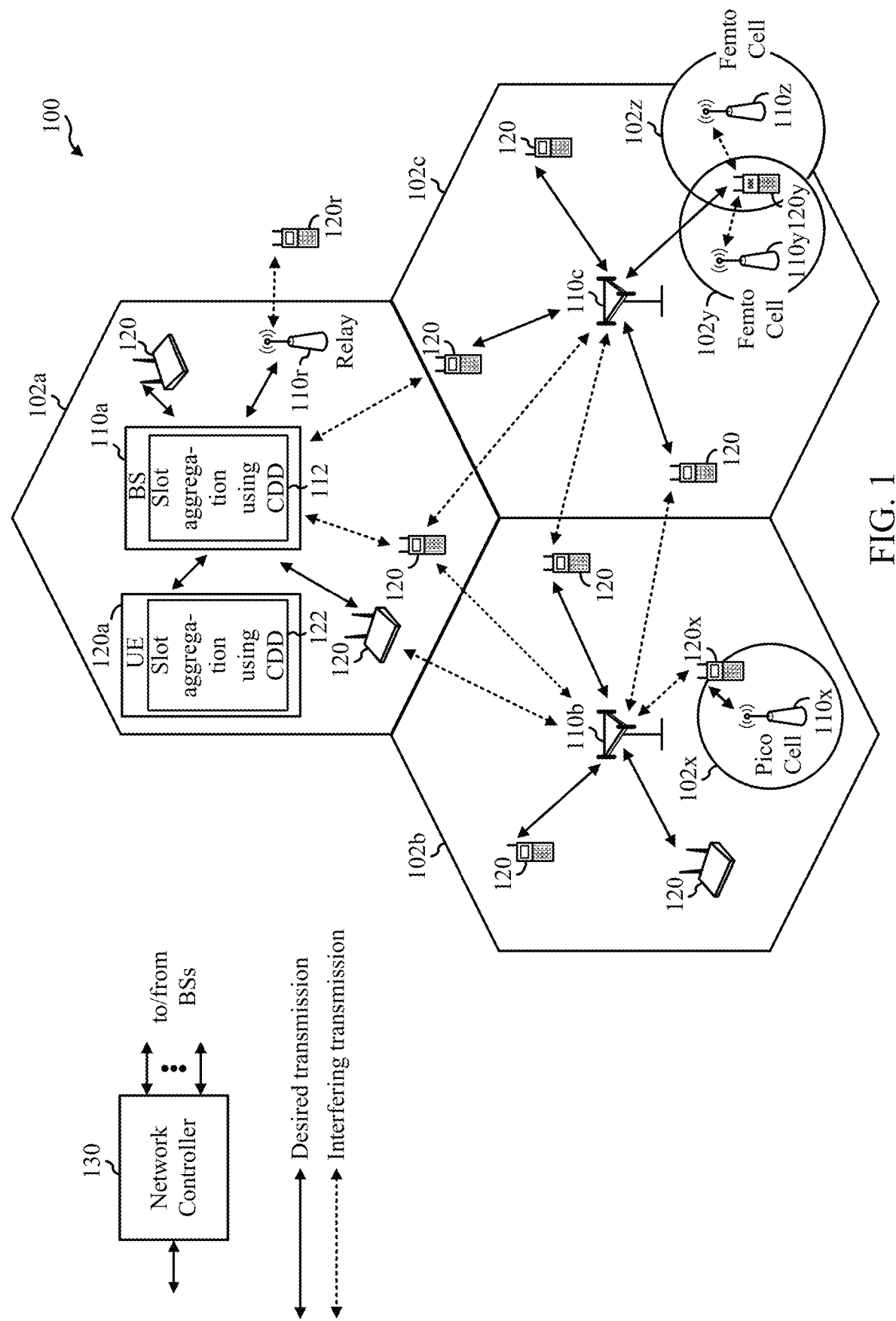
FIG. 1 is a block diagram conceptually illustrating an example telecommunications system, in accordance with certain aspects of the present disclosure.

Aspects of the present disclosure provide apparatus, methods, processing systems, and computer readable mediums for increasing diversity of transmissions with slot aggregation using slot-specific cyclic delay diversity (CDD). Slot aggregation is a technique in which a transmitter transmits the same data in the same frequency resources in each slot of a group of slots, and a receiver of the transmissions aggregates together the received signals to improve the probability that the receiver will successfully decode the data. Slot aggregation is supported in both Release 15 (Rel-15) and Release 16 (Rel-16) versions of 3GPP standards in order to improve coverage of physical downlink shared channel (PDSCH) and physical uplink shared channel (PUSCH) transmissions. In each aggregated slot, the resource element (RE) allocation for the transmission is the same, thus the transmission is repeated from slot to slot. There is no frequency diversity to be exploited in the current slot aggregation design, as the aggregated slots share the same frequency band, and the RE allocation in each slot is the same. CDD is a transmit diversity technique in which a transmitter adds a different phase delay for different orthogonal frequency division multiplexing (OFDM) tones on different transmission antenna ports. Considered in the frequency domain, each tone in each antenna port is multiplexed with a different phase rotation. Therefore, at a receiver, an equivalent channel on each tone, due to the different phase rotations, becomes different, even if the raw tone channel without CDD remains the same from tone to tone. Thus, frequency diversity can be exploited by a receiver after a transmitter applies CDD to a transmission. Considered in the time domain, equivalently, the payloads of different layers are cyclic shifted versions of each other. Thus, CDD can improve diversity of signals transmitted using slot aggregation, improving coverage for the transmitters transmitting those signals.

The following description provides examples of slot aggregation using slot-specific cyclic delay diversity (CDD) in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for slot aggregation using slot-specific cyclic delay diversity (CDD). As shown in FIG. 1, the BS 110a includes a slot aggregation using CDD manager 112. The slot aggregation using CDD manager 112 may be configured to determine to transmit a signal using cyclic delay diversity (CDD) in a plurality of slots; and to transmit the signal using a different cyclic delay in each slot of the plurality of slots, in accordance with aspects of the present disclosure. In some examples, the slot aggregation using CDD manager 112 may determine that a signal from a transmitting device is transmitted using cyclic delay diversity (CDD) in a plurality of slots; and receive the signal based on a different cyclic delay in each slot of the plurality of slots. As shown in FIG. 1, the UE 120a includes a slot aggregation using CDD manager 122. The slot aggregation using CDD manager 122 may be configured to determine to transmit a signal using cyclic delay diversity (CDD) in a plurality of slots; and to transmit the signal using a different cyclic delay in each slot of the plurality of slots, in accordance with aspects of the present disclosure. In some examples, the slot aggregation using CDD manager 122 may determine that a signal from a transmitting device is transmitted using cyclic delay diversity (CDD) in a plurality of slots; and receive the signal based on a different cyclic delay in each slot of the plurality of slots.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
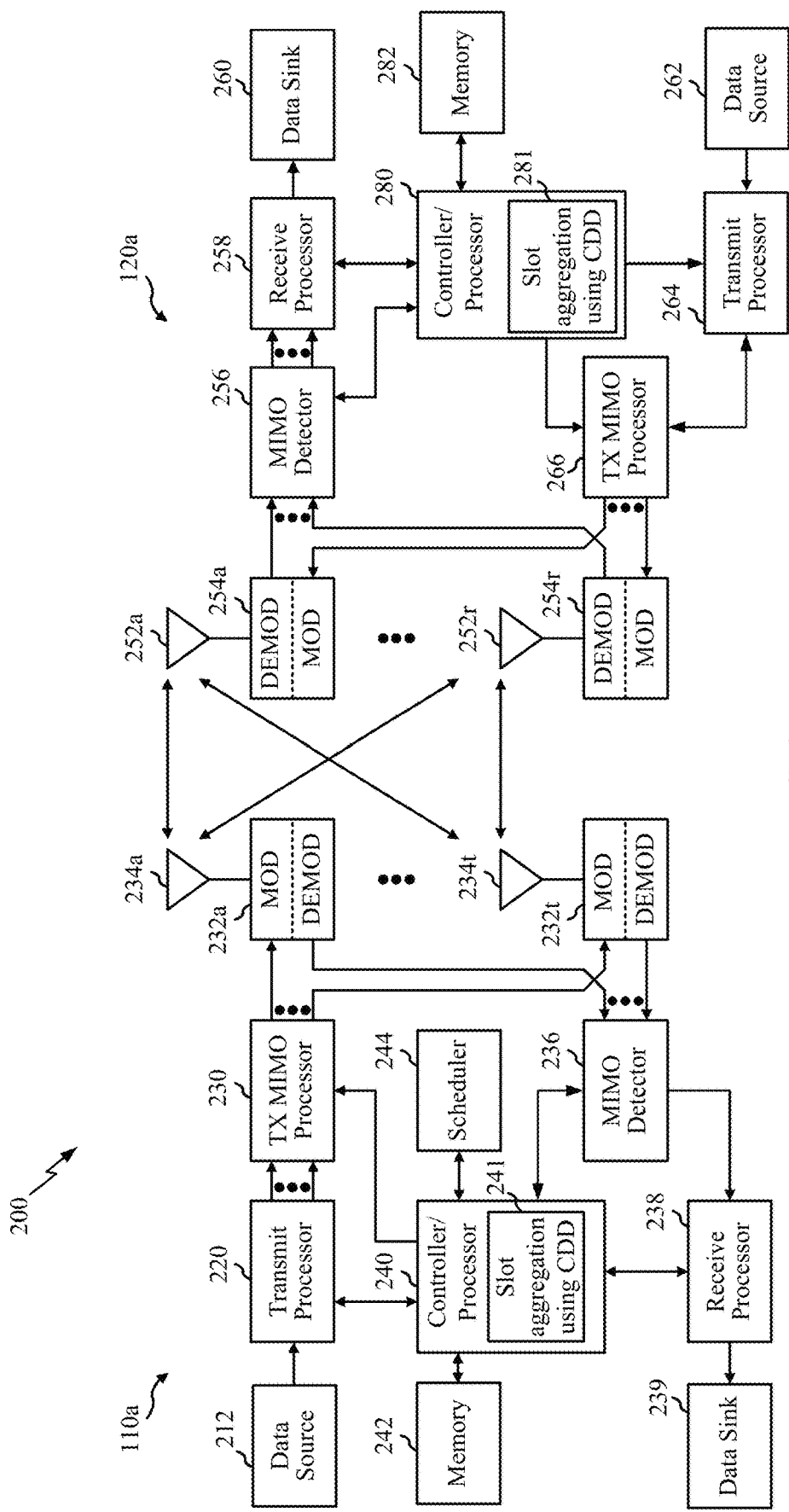
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a slot aggregation using CDD manager 241 that may be configured for determining to transmit a signal using cyclic delay diversity (CDD) in a plurality of slots; and for transmitting the signal using a different cyclic delay in each slot of the plurality of slots, according to aspects described herein. The slot aggregation using CDD manager 241 may also be configured for determining that a signal from a transmitting device is transmitted using cyclic delay diversity (CDD) in a plurality of slots; and for receiving the signal based on a different cyclic delay in each slot of the plurality of slots. As shown in FIG. 2, the controller/processor 280 of the UE 120a has an slot aggregation using CDD manager 281 that may be configured for determining to transmit a signal using cyclic delay diversity (CDD) in a plurality of slots; and for transmitting the signal using a different cyclic delay in each slot of the plurality of slots, according to aspects described herein. The slot aggregation using CDD manager 281 may also be configured for determining that a signal from a transmitting device is transmitted using cyclic delay diversity (CDD) in a plurality of slots; and for receiving the signal based on a different cyclic delay in each slot of the plurality of slots. Although shown at the Controller/Processor, other components of the UE 120a and BS 110a may be used performing the operations described herein.

Figure 3A:
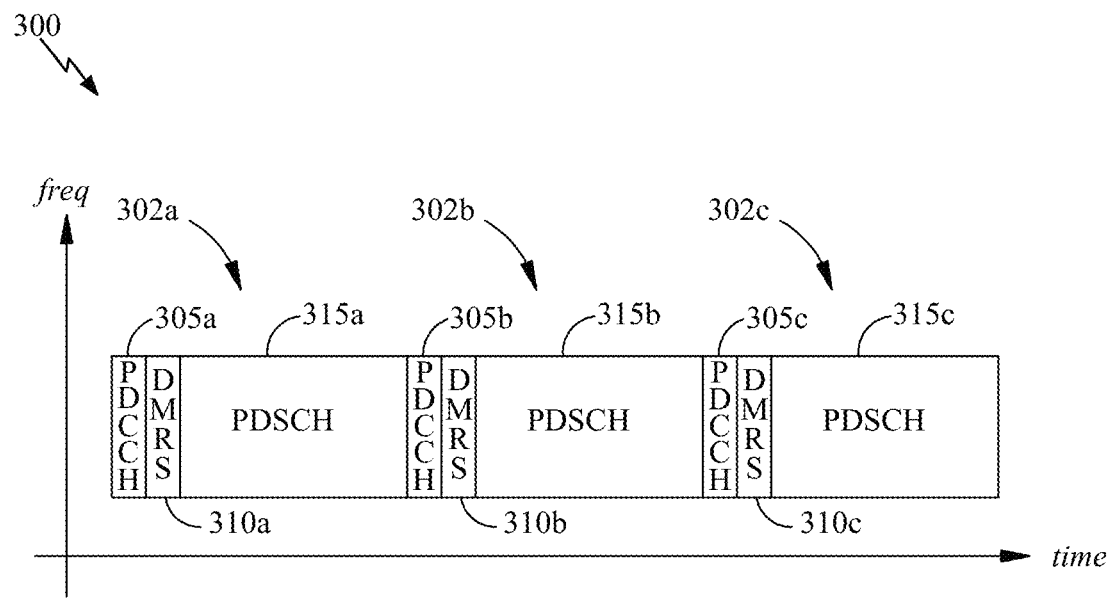
FIGS. 3A & 3B are schematic resource allocations 300 and 350 of signals sent using slot aggregation, according to previously known techniques.
Figure 3B:
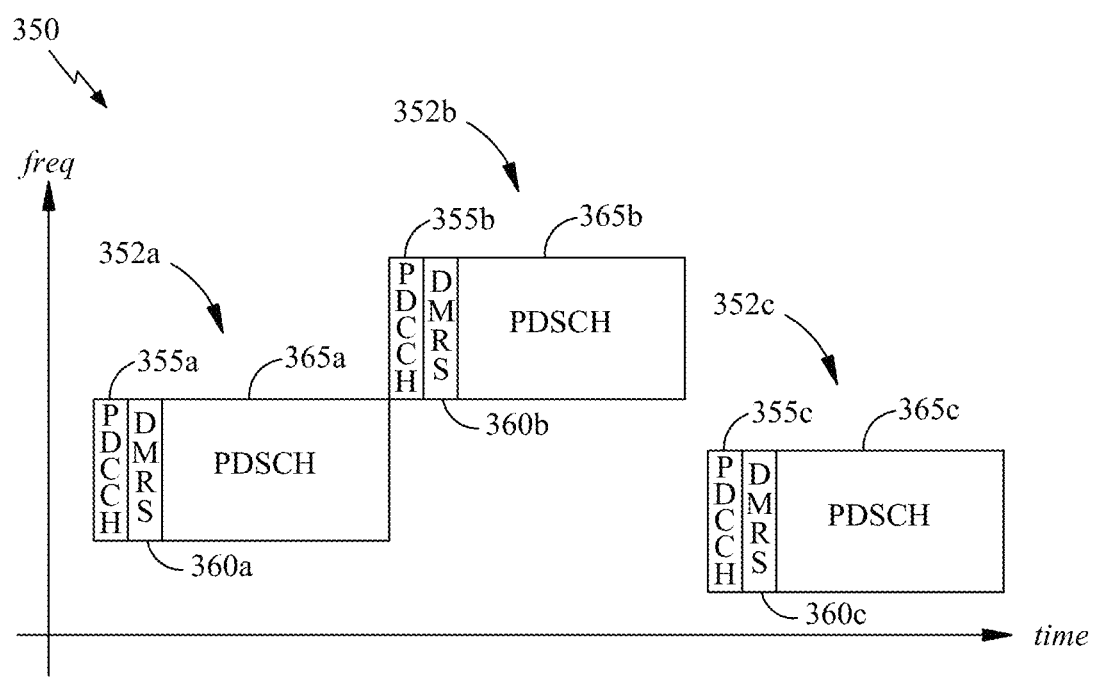

FIGS. 3A & 3B are schematic resource allocations 300 and 350 of signals sent using slot aggregation, according to previously known techniques. In the schematic resource allocation 300, a signal 302a including a physical downlink control channel (PDCCH) 305a, a demodulation reference signal (DMRS) 310a, and a physical downlink shared channel (PDSCH) 315a is shown. Two repetitions 302b and 302c of the signal 302a are also shown in the same frequency resources and later slots. Each of the repetitions 302b and 302c includes a PDCCH 305b or 305c, a DMRS 310b or 310c, and a PDSCH 315b or 315c. In the schematic resource allocation 350, a signal 352a including a physical downlink control channel (PDCCH) 355a, a demodulation reference signal (DMRS) 360a, and a physical downlink shared channel (PDSCH) 365a is shown. Two repetitions 352b and 352c of the signal 352a are also shown in later slots and different frequency resources, thus the signals are transmitted with frequency diversity and slot aggregation. Each of the repetitions 352b and 352c includes a PDCCH 355b or 355c, a DMRS 360b or 360c, and a PDSCH 365b or 365c.

Figure 4:
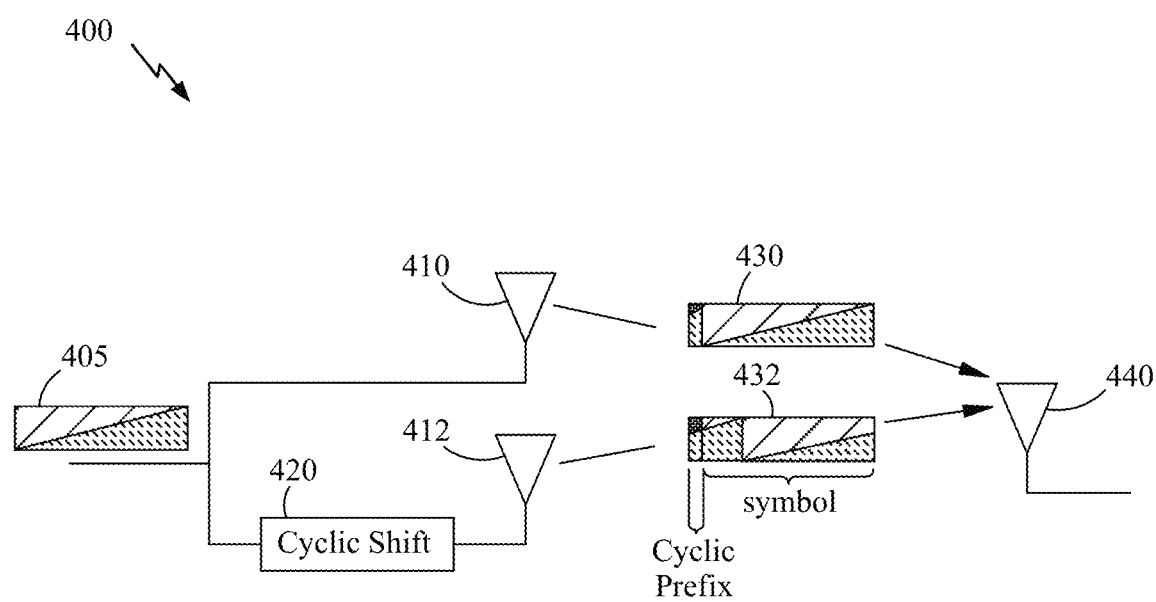
FIG. 4 is a schematic diagram of an exemplary communications system in which CDD is used, according to previously known techniques.

FIG. 4 is a schematic diagram of an exemplary communications system 400 in which CDD is used, according to previously known techniques. In the exemplary communications system 400, the data 405 is transmitted via a first antenna 410 and is cyclically shifted at 420 and transmitted via a second antenna 412. Thus, a first version 430 of the data and a second version 432 of the data are received by the receiver 440. The cyclic shift results in increased diversity between the 2 spatial paths, i.e., the first path from the first antenna 410 and the second path from the second antenna 412. The increased diversity between the two paths improves the receiver's receiving of the data.

Figure 5:
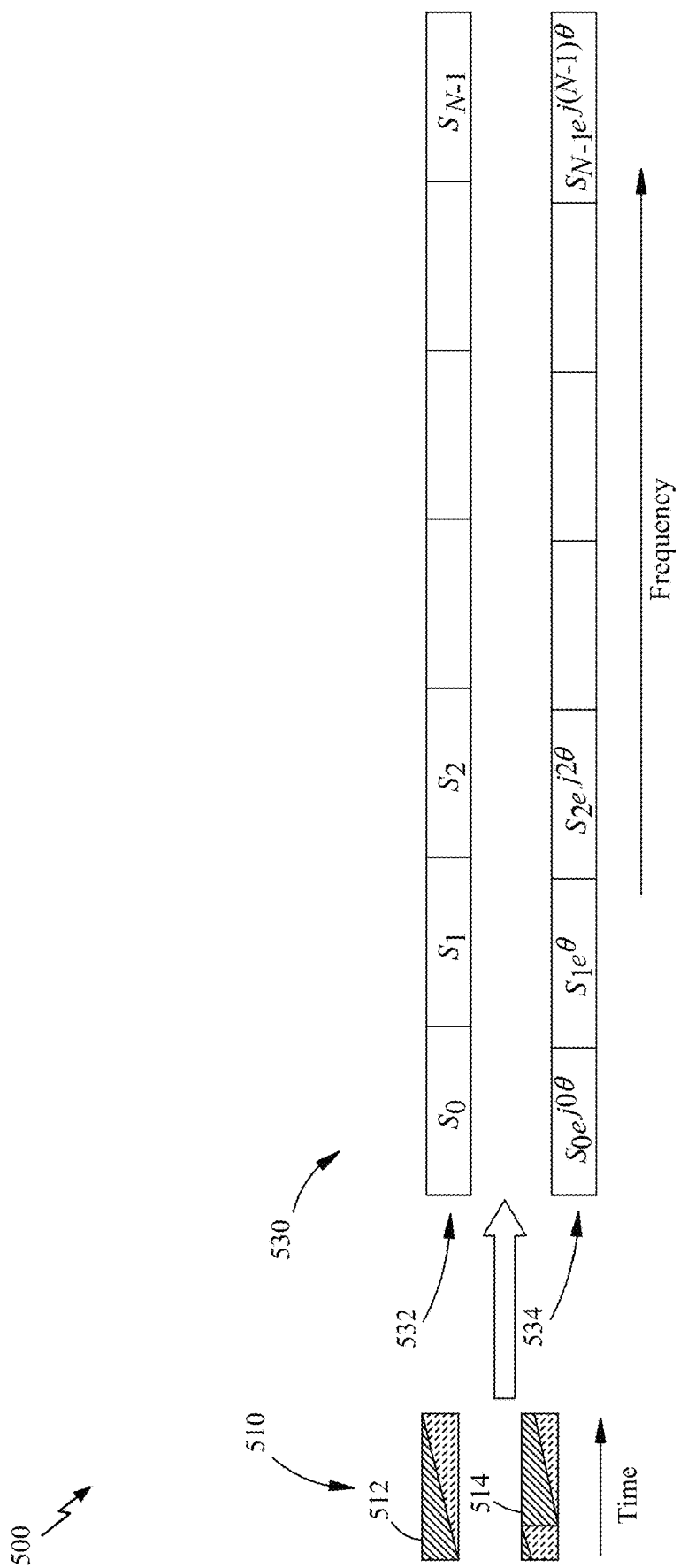
FIG. 5 is a transmission sent with CDD, in accordance with certain aspects of the present disclosure.

FIG. 5 is a transmission 500 sent with CDD represented in the time domain at 510 and in the frequency domain at 530, according to aspects of the present disclosure. According to aspects of the present disclosure, a signal subject to a cyclic shift in time can be represented in the frequency domain as a phase shifted transmission. An original version 512 and a cyclically shifted version 514 of the data are shown. In the frequency domain, the unshifted version of the data is represented by a series of values $S_0$ to $S_{N-1}$, as shown at 532, while the shifted version is represented by phase shifted values $S_0$ to $S_{N-1}e^{j(N-1)\theta}$, as shown at 534.

Figure 6A:
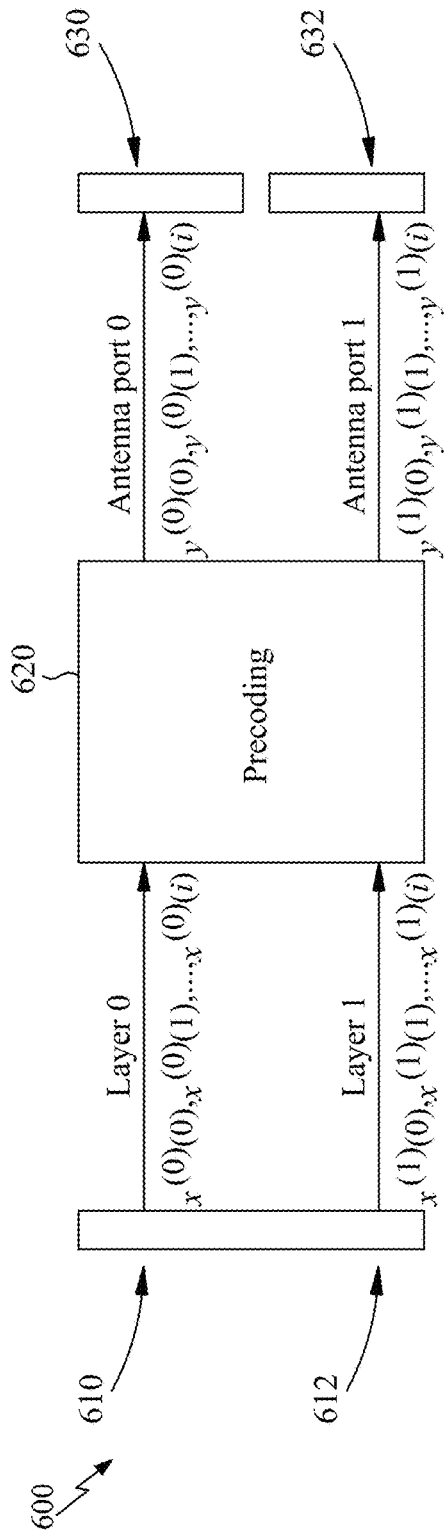
FIGS. 6A & 6B are schematic representations of precoding for a spatially-multiplexed transmission, in accordance with certain aspects of the present disclosure.
Figure 6B:
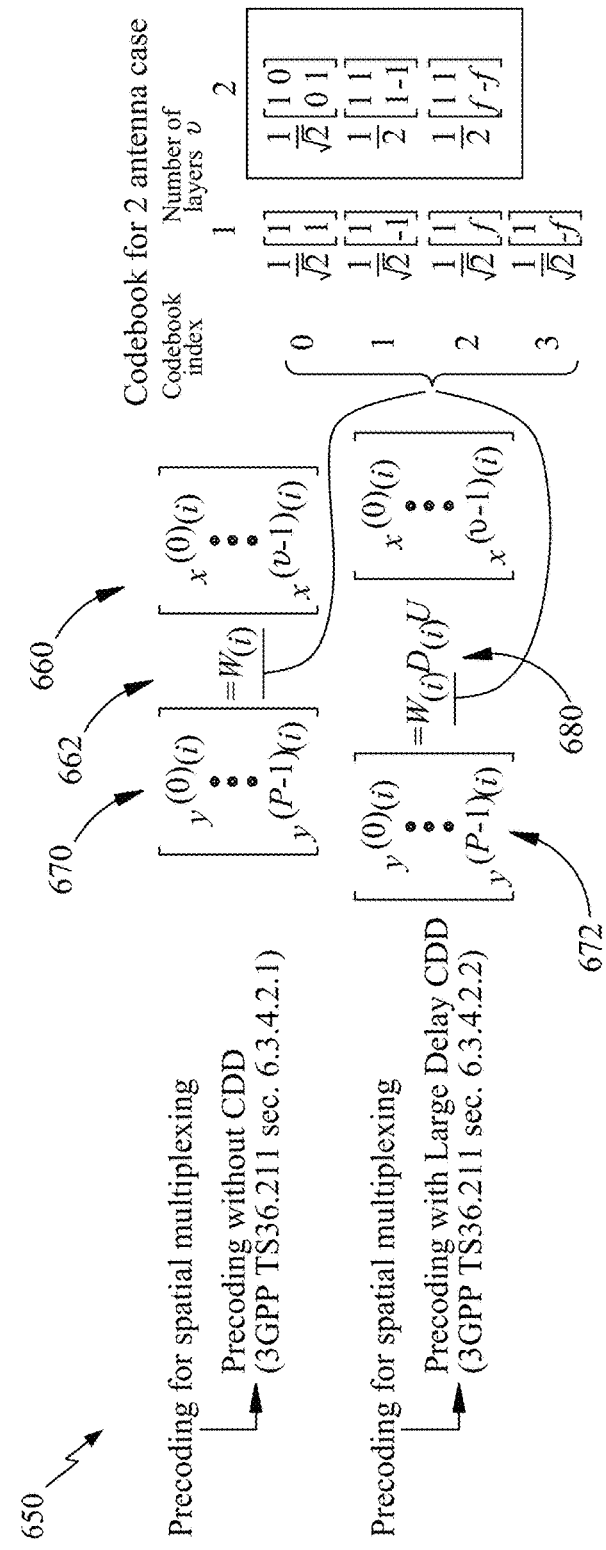

FIGS. 6A & 6B are schematic representations 600 and 650 of precoding for a spatially-multiplexed transmission. In the representation 600, a first data set 610 for layer 0 and a second data set 612 for layer 1 are acted on by a precoder 620 to generate symbols 630 for transmission via antenna port 0 and symbols 632 for transmission via antenna port 1. In the representation 600, no CDD is used for the spatially-multiplexed transmission. In the representation 650, a first data set 660 is acted on by a precoding matrix 662 to generate symbols 670 for transmission (see, e.g., 3GPP TS 36.211 sec. 6.3.4.2.1). If the signal is to be transmitted with CDD, then the data set is acted on by the precoding matrix and a delay matrix 680 to generate the shifted symbols 672 for transmission (see, e.g., 3GPP TS 36.211 sec. 6.3.4.2.2).

Example Increase Diversity of Slot Aggregation Using Slot-Specific Cyclic Delay Diversity Aspects of the present disclosure provide apparatus, methods, processing systems, and computer readable mediums for increasing diversity of transmissions with slot aggregation using slot-specific cyclic delay diversity (CDD). CDD may be a transmit diversity mechanism implemented by applying a different phase delay for each OFDM subcarrier. CDD may be used in spatial multiplexing to increase diversity between the two spatial paths, with each path corresponding to an antenna. One antenna may transmit an original copy of data and the other antenna may transmit the cyclic delayed version of the original data, as shown in FIG. 4. The original version and the shifted version may be received together by a receiving entity (e.g., a UE). By adding delays to the copy from one antenna, in the frequency domain, different OFDM symbols in the copy have different phase shifts (that is, the cyclic delay or shift in time domain may be represented by a phase shift in frequency domain). At least some of those phase shifts may help the shifted version and the original version of the signals add up coherently in at least a subset of tones, which boosts the signal power received by the receiver, i.e., improves diversity in the frequency domain.

In aspects of the present disclosure, to increase frequency diversity for downlink (DL) transmissions, for different slots in the aggregation, a BS (e.g., a gNB) can use different delay values for different layers (e.g., slot specific CDD). For example, a BS may transmit a $1^{st}$ slot with no CDD (0 delay difference), a $2^{nd}$ slot with a certain value of delay difference between ports. In this way, the channel at each tone is different from slot to slot, due to adding different delay differences across ports.

According to aspects of the present disclosure, a delay for each slot may be determined by BS implementation (e.g., random small delays), based on one or more of rules in wireless communications standards (e.g., any of the 3GPP specifications, which are publicly available), signaling received from another device (e.g., a BS may use a delay for each slot requested by a receiving UE), or an indication (e.g., a measurement) of a channel to another device.

In aspects of the present disclosure, delay(s) chosen by a BS may be indicated to a receiving UE.

According to aspects of the present disclosure, a receiving UE may be notified (e.g., via an indication in a transmission from the BS) that CDD of different values of delay are applied to a transmission.

In aspects of the present disclosure, if a UE is not notified that CDD of different values of delay are applied to a transmission, a UE may assume a received channel is the same from slot to slot and try to soft-combine DMRS and/or data from the slots.

According to aspects of the present disclosure, slot-specific cyclic delay diversity may be triggered at a BS in response to a UE request. For example, a UE may determine, based on decoding previous slots, that the channel is very frequency flat, and the UE may then request more frequency diversity.

According to aspects of the present disclosure, to increase frequency diversity of uplink (UL) transmissions, for different slots in an aggregation, a UE can use different delay values of CDD.

In aspects of the present disclosure, a UE may start using different delay values of CDD after receiving an indication from a BS for the UE to start using the different delay values of CDD. The indication from the BS may contain the value of delay differences in each slot for each layer.

Additionally or alternatively, a UE may determine whether to start using different delay values of CDD and inform a BS (e.g., a gNB) that the UE is applying slot-specific CDD.

According to aspects of the present disclosure, the delay value for UL transmissions may be determined based on network communications standards (e.g., any of the 3GPP specifications, which are publicly available).

In aspects of the present disclosure, the delay value for UL transmissions may be specific to a UE implementation, and the UE may report the implementation to a BS.

According to aspects of the present disclosure, slot-specific CDD for UL signals may be triggered by the UE requesting to a BS for the UE to begin using slot-specific CDD for UL signals. In aspects of the present disclosure, a UE may request to begin using slot-specific CDD, and if a BS agrees that the UE should begin using slot-specific CDD, the BS sends an indication to the UE to start slot-specific CDD.

Figure 7:
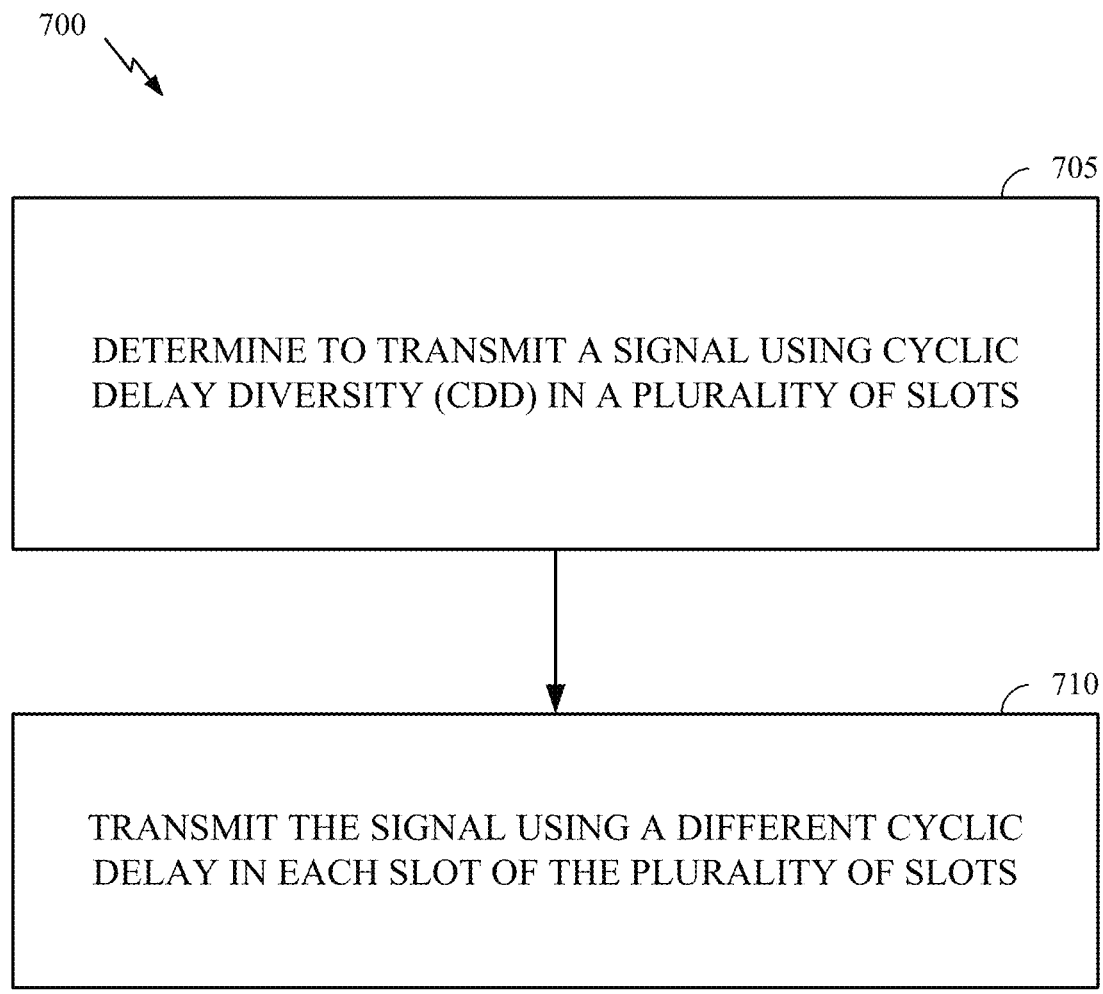
FIG. 7 is a flow diagram illustrating example operations for wireless communication performed by a transmitting device, in accordance with aspects of the present disclosure.

FIG. 7 is a flow diagram illustrating example operations 700 for wireless communication, in accordance with certain aspects of the present disclosure. The operations 700 may be performed, for example, by a transmitting device (e.g., such as the BS 110a in the wireless communication network 100). Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at block 705, by the transmitting device determining to transmit a signal using cyclic delay diversity (CDD) in a plurality of slots. For example, the transmitting device, such as the BS 110a of FIG. 1, determines to transmit a signal and one or more phase shifted copies, using CDD, of the signal in multiple slots to a receiving device, such as the UE 120a of FIG. 1. In some cases, the transmitting device may include a transmit processor such as the transmit processor 220 of FIG. 2. The transmit processor 220 may determine the CDD implementation and may operate with the controller processor 240, which includes the slot aggregation using CDD manager 241.

Operations 700 continue at block 710 with the transmitting device transmitting the signal using a different cyclic delay in each slot of the plurality of slots. For example, the transmitting device, such as the BS 110a of FIG. 1, transmits the signal to the receiving device, such as the UE 120a of FIG. 1, using a different cyclic delay in the transmitted signal in each of the plurality of slots. In some cases, the transmit processor 220 and/or the controller/processor 240 of FIG. 2 may implement the different cyclic delay in the signal to be transmitted. For example, the transmit processor 220 may generate values for the different cyclic delay and implement the cyclic delay in CDD.

In some cases, the transmitting device, such as the BS 110a of FIG. 1, may implement the different delays according to various schemes, such as random small delays. Such delay schemes may be indicated to the UE. In some cases, the delay scheme may be based on certain rules in communication standards. In some cases, the UE may trigger certain delay schemes for an increase of frequency diversity by sending the gNB a request, such as when the UE determines, by decoding previous slots, that the channel has flat or monotonous frequency.

Operations 700 performed by the transmitting device, such as a base station (e.g., BS 110a of FIG. 1), may apply to either or both downlink and uplink transmissions. For example, during a downlink transmission, the gNB may determine the delay scheme and indicates the chosen delay scheme to the UE. During an uplink transmission, the UE may implement the different delays after receiving the gNB indication. When the UE sends a request for increasing the frequency diversity, for an uplink or a downlink transmission, the UE may first send such request to the gNB, and operate according to the request after receiving acknowledgement from the gNB.

According to aspects of the present disclosure, a device performing operations 700 may decide the different cyclic delays based on at least one of a network communications specification (e.g., 3GPP specifications, which are publicly available), signaling received from another device, or a measurement of a channel to the other device.

In aspects of the present disclosure, transmitting the signal as in block 710 may include transmitting a same data portion in each slot for an intended recipient to receive using slot aggregation.

According to aspects of the present disclosure, a device performing operations 700 may receive a request from an intended recipient of the signal to transmit the signal using CDD, wherein the determining of block 705 is based on the request. In aspects of the present disclosure, the request may indicate the cyclic delays.

In aspects of the present disclosure, transmitting the signal as in block 710 may include transmitting the signal on a plurality of layers, and the cyclic delays of block 710 may include a cyclic delay for each of the layers in each of the slots.

According to aspects of the present disclosure, the determining of block 705 may be based on an indication of a channel condition (e.g., receiving a negative acknowledgment (NAK), receiving a request to increase transmit power, or a measurement of channel state) between the transmitting device and an intended recipient of the signal.

In aspects of the present disclosure, the determining of block 705 may be based on another signal from an intended recipient of the signal.

According to aspects of the present disclosure, a device performing operations 700 may transmit an indication of the determination of block 705 to transmit the signal using CDD. In aspects of the present disclosure, the indication may include an indication of the cyclic delays.

In aspects of the present disclosure, a device performing operations 700 may be a user equipment (UE) and the signal of blocks 705 and 710 may be an uplink (UL) signal.

According to aspects of the present disclosure, a device performing operations 700 may be a base station (BS) and the signal of blocks 705 and 710 may be a downlink (DL) signal.

Figure 8:
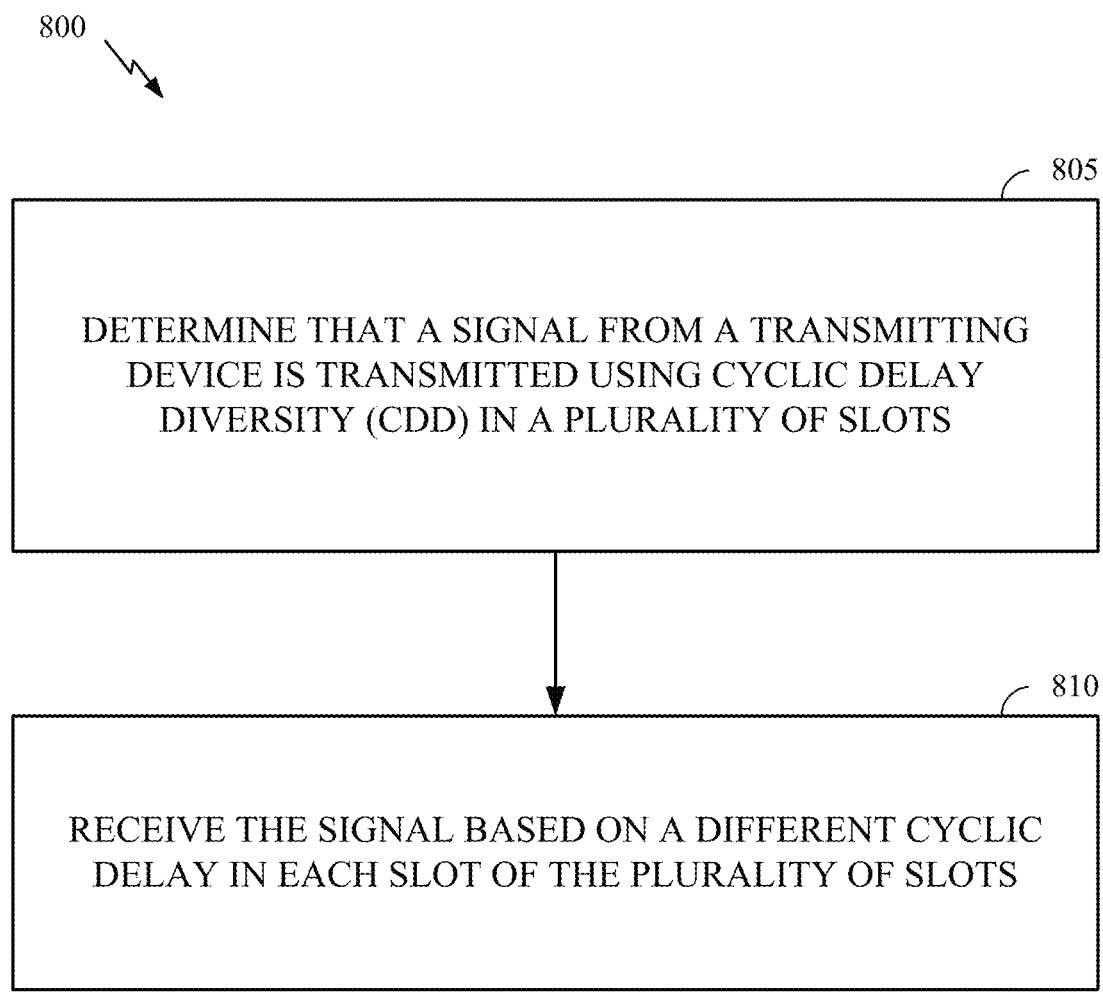
FIG. 8 is a flow diagram illustrating example operations for wireless communication performed by a receiving device, in accordance with aspects of the present disclosure.

FIG. 8 is a flow diagram illustrating example operations 800 for wireless communication, in accordance with certain aspects of the present disclosure. The operations 800 may be performed, for example, by a receiving device (e.g., such as a UE 120a in the wireless communication network 100). The operations 800 may be complimentary operations by the receiving device to the operations 800 performed by the transmitting device. Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 805, by the receiving device determining that a signal from a transmitting device is transmitted using cyclic delay diversity (CDD) in a plurality of slots. For example, the receiving device may be the UE 120a of FIG. 1. In the example, the UE 120a determines that a signal from a transmitting device (e.g., BS 110a in FIG. 1) is transmitted using cyclic delay diversity (CDD) in a plurality of slots. The UE 120a may include the receive processor 258 of FIG. 2 that determines the signal being transmitted using CDD. In some cases, the receive processor 258 operates with the controller/processor 280, which includes a slot aggregation using CDD manager 281.

Operations 800 may continue, at block 810, with the receiving device receiving the signal based on a different cyclic delay in each slot of the plurality of slots. For example, the UE 120a of FIG. 1 receives the signal of block 805 based on a different cyclic delay in each slot of the plurality of slots. In some cases, the receive processor 258 and/or the controller/processor 280 of FIG. 2 may use CDD to validate the signal on the different cyclic delay in each slot of the plurality of slots. For example, a first slot may not include any CDD, a second slot includes CDD with certain value of delay difference between ports, and a third slot includes CDD with another value of delay difference between ports, and so on. In this way, the channel at each tone is different from slot to slot due to adding difference delay differences across ports. The different cyclic delay then increases frequency diversity for the different slots in the aggregation.

Operations 800 performed by the receiving device, such as the UE 120a, may apply to either or both downlink and uplink transmissions. For example, during a downlink transmission, the transmitting device (e.g., a base station such as gNB) may determine the delay scheme and indicate the chosen delay scheme to the receiving device. During an uplink transmission, the receiving device may implement the different delays after receiving the gNB indication. When the UE sends a request for increasing the frequency diversity, for an uplink or a downlink transmission, the UE may first send such request to the gNB, and operate according to the request after receiving acknowledgement from the gNB.

According to aspects of the present disclosure, receiving the signal as in block 810 may include receiving a same data portion in each slot using slot aggregation.

In aspects of the present disclosure, a device performing operations 800 may transmit a request to the transmitting device to transmit the signal using CDD, wherein the determining of block 805 may be based on the request. According to aspects of the present disclosure, the request may indicate the cyclic delays of block 810.

According to aspects of the present disclosure, receiving the signal as in block 810 may include receiving the signal on a plurality of layers, and the cyclic delays may include a cyclic delay for each of the layers in each of the slots.

In aspects of the present disclosure, the determining of block 805 may be based on an indication of a channel condition (e.g., receiving a negative acknowledgment (NAK), receiving a request to increase transmit power, or a measurement of channel state) between the transmitting device and the receiving device.

According to aspects of the present disclosure, the determining of block 805 may be based on another signal from the transmitting device.

In aspects of the present disclosure, a device performing operations 800 may receive an indication from the transmitting device that the transmitting device will transmit the signal of blocks 805 and 810 using CDD. According to aspects of the present disclosure, the indication may include an indication of the plurality of cyclic delays.

According to aspects of the present disclosure, a device performing operations 800 may soft-combine two or more demodulation reference signals (DMRS), based on the cyclic delays of block 810, each DMRS included in a different slot of the plurality of slots.

In aspects of the present disclosure, the receiving device may be a user equipment (UE) and the signal of blocks 805 and 810 may be a downlink (DL) signal.

According to aspects of the present disclosure, the receiving device may be a base station (BS) and the signal of blocks 805 and 810 may be an uplink (UL) signal.

Figure 9:
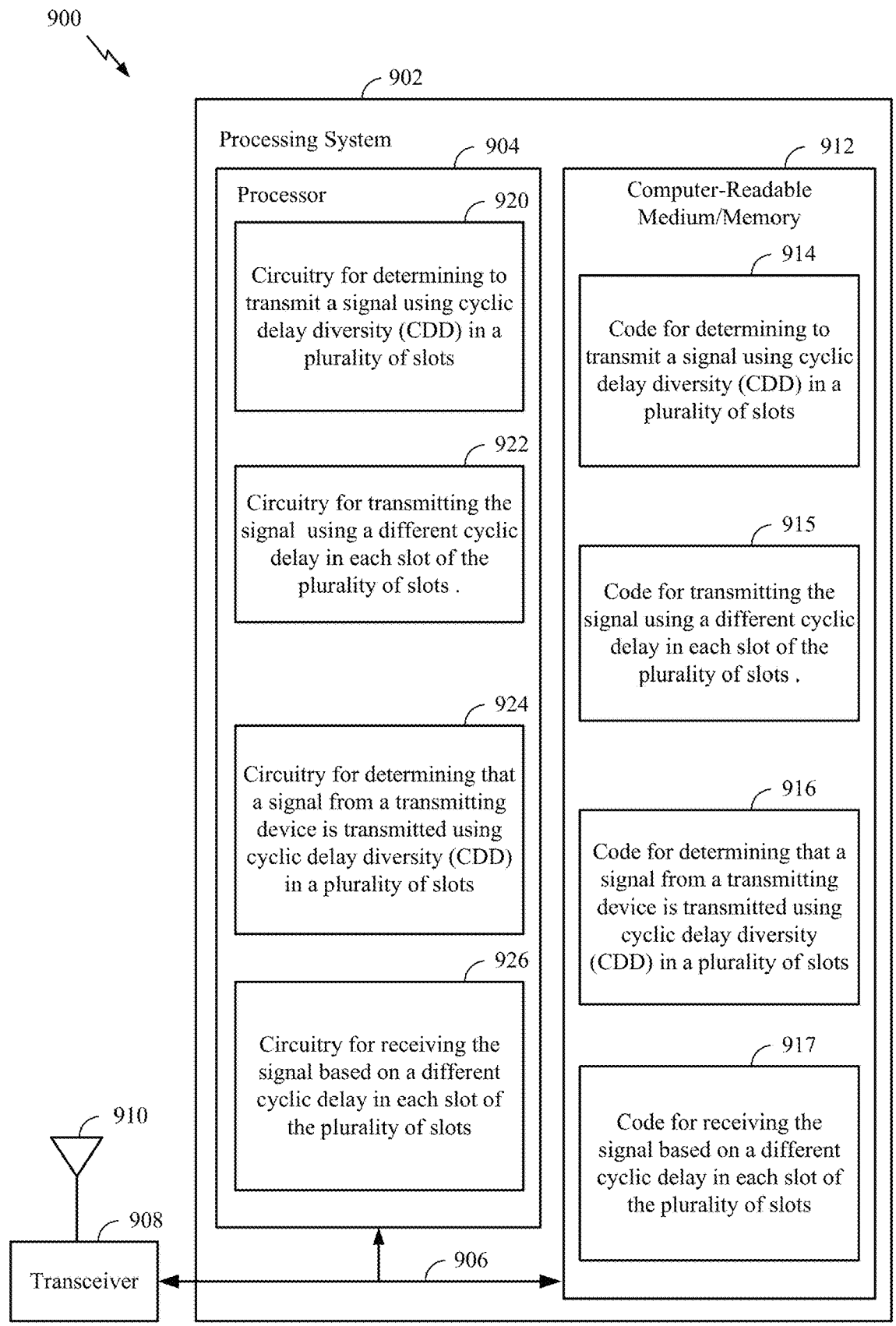
FIG. 9 illustrates a communications device that may include various components configured to perform the operations illustrated in FIGS. 7 & 8, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIGS. 7 & 8. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 7 & 8, or other operations for performing the various techniques discussed herein for increasing diversity of transmissions with slot aggregation using slot-specific cyclic delay diversity (CDD). In certain aspects, computer-readable medium/memory 912 stores code 914 for determining to transmit a signal using cyclic delay diversity (CDD) in a plurality of slots; code 915 for transmitting the signal using a different cyclic delay in each slot of the plurality of slots; code 916 for determining that a signal from a transmitting device is transmitted using cyclic delay diversity (CDD) in a plurality of slots; and cod 917 for receiving the signal based on a different cyclic delay in each slot of the plurality of slots. In certain aspects, the processor 904 has circuitry configured to implement the code stored in the computer-readable medium/memory 912. The processor 904 includes circuitry 920 for determining to transmit a signal using cyclic delay diversity (CDD) in a plurality of slots; circuitry 922 for transmitting the signal using a different cyclic delay in each slot of the plurality of slots; circuitry 924 for determining that a signal from a transmitting device is transmitted using cyclic delay diversity (CDD) in a plurality of slots; and circuitry 926 for receiving the signal based on a different cyclic delay in each slot of the plurality of slots.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication performed by a transmitting device, comprising:
receiving a request from an intended recipient of a signal to transmit the signal using cyclic delay diversity (CDD);
determining to transmit the signal using CDD in a plurality of slots based on the request; and
transmitting the signal on a plurality of layers using a different cyclic delay for each of the layers in each slot of the plurality of slots.

2. The method of claim 1, further comprising:
deciding the different cyclic delays based on at least one of a network communications specification, signaling received from another device, or a measurement of a channel to the other device.

3. The method of claim 1, wherein transmitting the signal using a different cyclic delay in each slot of the plurality of slots comprises transmitting a same data portion in each slot for an intended recipient to receive using slot aggregation.

4. The method of claim 1, wherein the request indicates the cyclic delays.

5. The method of claim 1, wherein the determining is further based on an indication of a channel condition between the transmitting device and an intended recipient of the signal.

6. A method for wireless communication performed by a transmitting device, comprising:

determining to transmit a signal using cyclic delay diversity (CDD) in a plurality of slots based on another signal from an intended recipient of the signal; and transmitting the signal on a plurality of layers using a different cyclic delay for each of the layers in each slot of the plurality of slots.

7. A method for wireless communication performed by a transmitting device, comprising:

determining to transmit a signal using cyclic delay diversity (CDD) in a plurality of slots;

transmitting an indication of the determination to transmit the signal using CDD; and transmitting the signal on a plurality of layers using a different cyclic delay for each of the layers in each slot of the plurality of slots.

8. The method of claim 7, wherein the indication further comprises an indication of the cyclic delays.

9. The method of claim 1, wherein the transmitting device comprises a user equipment (UE) and the signal comprises an uplink (UL) signal.

10. The method of claim 1, wherein the transmitting device comprises a base station (BS) and the signal comprises a downlink (DL) signal.

11. A method for wireless communication performed by a receiving device, comprising:

determining that a signal from a transmitting device is transmitted using cyclic delay diversity (CDD) in a plurality of slots; and receiving the signal on a plurality of layers based on a different cyclic delay for each of the layers in each slot of the plurality of slots.

12. The method of claim 11, wherein receiving the signal based on a different cyclic delay in each slot of the plurality of slots comprises receiving a same data portion in each slot using slot aggregation.

13. The method of claim 11, further comprising:

transmitting a request to the transmitting device to transmit the signal using CDD, wherein the determining is based on the request.

14. The method of claim 13, wherein the request indicates the cyclic delays.

15. The method of claim 11, wherein the determining is based on an indication of a channel condition between the transmitting device and the receiving device.

16. The method of claim 11, wherein the determining is based on another signal from the transmitting device.

17. The method of claim 11, further comprising:

receiving an indication from the transmitting device that the transmitting device will transmit the signal using CDD.

18. The method of claim 17, wherein the indication further comprises an indication of the cyclic delays.

19. The method of claim 11, further comprising:

soft-combining two or more demodulation reference signals (DMRS), based on the cyclic delays, each DMRS included in a different slot of the plurality of slots.

20. The method of claim 11, wherein the receiving device comprises a user equipment (UE) and the signal comprises a downlink (DL) signal.

21. The method of claim 11, wherein the receiving device comprises a base station (BS) and the signal comprises an uplink (UL) signal.

22. An apparatus for wireless communication, comprising:

one or more processors configured to:

receive a request from an intended recipient of a signal to transmit the signal using cyclic delay diversity (CDD);

determine to transmit the signal using CDD in a plurality of slots based on the request; and transmit the signal on a plurality of layers using a different cyclic delay for each of the layers in each slot of the plurality of slots; and a memory coupled with the one or more processors.

23. The apparatus of claim 22, wherein the one or more processors are further configured to decide the different cyclic delays based on at least one of a network communications specification, signaling received from another device, or a measurement of a channel to the other device.

24. An apparatus for wireless communication, comprising:

one or more processors configured to:

determine that a signal from a transmitting device is transmitted using cyclic delay diversity (CDD) in a plurality of slots; and receive the signal on a plurality of layers based on a different cyclic delay for each of the layers in each slot of the plurality of slots; and a memory coupled with the one or more processors.

25. The apparatus of claim 24, wherein the one or more processors are further configured to transmit a request to the transmitting device to transmit the signal using CDD, wherein the determining is based on the request.

26. The apparatus of claim 24, wherein the one or more processors are further configured to receive a same data portion in each slot using slot aggregation.

27. An apparatus for wireless communication, comprising:

one or more processors configured to:

determine to transmit a signal using cyclic delay diversity (CDD) in a plurality of slots based on another signal from an intended recipient of the signal; and transmit the signal on a plurality of layers using a different cyclic delay for each of the layers in each slot of the plurality of slots; and a memory coupled with the one or more processors.

28. An apparatus for wireless communication, comprising:

one or more processors configured to:

determine to transmit a signal using cyclic delay diversity (CDD) in a plurality of slots;

transmit an indication of the determination to transmit the signal using CDD; and transmit the signal on a plurality of layers using a different cyclic delay for each of the layers in each slot of the plurality of slots; and a memory coupled with the one or more processors.

* * * * *